United States Patent [19]
Bolli et al.

[11] Patent Number: 5,322,466
[45] Date of Patent: Jun. 21, 1994

[54] DETACHABLE CONNECTING DEVICE FOR TOY-CONSTRUCTION ELEMENTS

[75] Inventors: Peter Bolli, Steinhausen; Heinz Looser, Baar, both of Switzerland

[73] Assignee: Interlego A.G., Baar, Switzerland

[21] Appl. No.: 23,482

[22] Filed: Feb. 25, 1993

Related U.S. Application Data

[63] Continuation of Ser. No. 634,205, Oct. 11, 1990, abandoned.

[30] Foreign Application Priority Data

Feb. 24, 1989 [CH] Switzerland ............................ 679/89

[51] Int. Cl.⁵ .................... A63H 33/06; A63H 33/08; A63H 33/00; A41F 1/00
[52] U.S. Cl. .................................. 446/121; 446/113; 446/111; 446/86; 24/453; 24/607; 411/50; 411/57
[58] Field of Search ............... 446/121, 120, 122, 123, 446/115, 113, 112, 111, 86, 85; 24/453, 606, 607, 625; 411/41, 44, 45, 50, 57, 356

[56] References Cited

U.S. PATENT DOCUMENTS

| | | | |
|---|---|---|---|
| 2,885,822 | 5/1959 | Onanian | 446/121 |
| 2,898,798 | 8/1959 | Carno | 411/57 |
| 3,112,547 | 12/1963 | Poe | |
| 3,192,738 | 7/1965 | Charles et al. | 446/121 X |
| 3,378,219 | 4/1968 | Biesecker | 411/57 X |
| 3,406,431 | 10/1968 | Armstrong et al. | 24/297 X |
| 3,568,263 | 3/1971 | Meehan | 24/453 X |
| 3,611,609 | 10/1971 | Reijnhard | 446/121 |
| 3,697,104 | 10/1972 | Soulie et al. | 24/607 X |
| 3,744,101 | 7/1973 | Gley | 24/453 |
| 3,918,130 | 11/1975 | Poe | 24/453 |
| 4,114,509 | 9/1978 | Poe | 24/607 X |
| 4,405,272 | 9/1983 | Wollar | 411/45 X |
| 4,531,870 | 7/1985 | Moryl et al. | 24/453 X |
| 4,551,110 | 11/1985 | Selvage et al. | 446/86 X |
| 4,674,930 | 6/1987 | Poe et al. | 24/606 X |
| 4,729,606 | 3/1988 | Narita et al. | 411/50 X |

FOREIGN PATENT DOCUMENTS

| | | | |
|---|---|---|---|
| 164187 | 10/1949 | Fed. Rep. of Germany | 446/123 |
| 3218072 | 12/1982 | Fed. Rep. of Germany | 446/120 |
| 81317 | 7/1963 | France | 24/297 |
| 1098642 | 1/1968 | United Kingdom | 24/297 |

*Primary Examiner*—Robert A. Hafer
*Assistant Examiner*—D. Neal Muir
*Attorney, Agent, or Firm*—Kane, Dalsimer, Sullivan, Kurucz, Levy, Eisele and Richard

[57] ABSTRACT

A connection device for toy construction sets comprises a cylindrical socket and a bolt-like locking element inserted therein. The socket is inserted into the bores of the construction elements to be connected and is provided at one end with a radially protruding outer edge shoulder as a retaining member as well as longitudinal slots. The locking element (9) is rotatable within the socket, but fixed axially and rotation of the locking element causes the socket to lock within the construction element.

14 Claims, 6 Drawing Sheets

DETACHABLE CONNECTING DEVICE FOR TOY-CONSTRUCTION ELEMENTS

This application is a continuation of application Ser. No. 07/634,205, filed Oct. 11, 1990, now abandoned.

BACKGROUND OF THE INVENTION

The invention relates to a detachable connecting device for connecting at least two toy-construction elements each being provided with a bore, a socket defined for introduction into the bore of the structural elements which has a cylindrical shaft section and at one end longitudinal slots for achieving a radial elasticity, and which at its free end is provided with a radially protruding small outerledge shoulder defined to lock the one structural element positively after the introduction of the socket into the bore of the structural elements, as well as an engagement flange at the end of the cylindrical shaft section facing away from the edge shoulder.

A detachable connecting device of the aforementioned type is known from Swiss Patent Number 655,247. In accordance with this patent two toy-construction elements which have to be connected with each other are provided each with a cylindrical bore and are connected to each other by a substantially cylindrical socket extending through the two bores. In one of its end areas the socket is provided with two longitudinal slots which cause a radial elasticity of this end area. The socket is provided at its slotted end with a radial outer edge shoulder. In the opposite end area the socket is provided with an outer annular like flange. Moreover, the two construction elements which have to be connected with each other are each provided at the outer side of their bores with an annular like recess. For connecting the two interengaging construction elements the socket with the edge shoulder end is pushed through the bore of the two construction elements, which is made possible due to the radial elasticity of the slotted end area of the socket. In the end position of the socket the edge shoulder of the socket locks into the annular recess of the one construction element, while the annular like flange of the socket engages the annular like recess of the other construction element, so that the two construction elements are held together by the socket.

A further embodiment of a detachable connection device of the aforementioned type is known from Swiss Patent Number 658,887. In accordance with this patent a socket of the aforedescribed type is formed as a double socket in that the socket is slotted and is provided with an outer edge shoulder at both ends whereby the mentioned annular like flange is mounted in the longitudinal center of the socket. Such a socket is used to detachably connect two construction elements, whose bore ends are provided with annular like recesses on both wall faces of each construction element.

These known and commercially available connection devices are detachable in that two connected construction elements may be pulled apart by overcoming the spring force of the slotted elastic end of the socket on the edge shoulder. However, such devices have a disadvantage in that detachment may occur unintentionally if, during an operation mode, a separating force is applied to a construction element containing such a connecting device.

It is therefore an object of the invention to provide a detachable connection device of the aforementioned type which enables, with a simple actuation, a clear locking of the socket or a clear release of the socket on the construction elements being connected therewith.

This object is attained in accordance with the present invention by providing a bolt like locking element inserted into the socket which is movable between two positions relative to the socket, whereby in the first position an end section at the free end of the locking element engages the inner face in the area of the radial plane of the edge shoulder and in the second position is spaced from the inner face of the socket in the area of the radial plane of the edge shoulder.

From Swiss Patent Number 609,752 a mounting element for detachably connecting two pieces of sheet metals are known. The mounting element consists of eye and pin parts which are injection molded in one piece with nominal breaking point locations. In the initial position the pin part is protruded axially from a central bore of the eye. At its one end the eye has an engagement flange. Adjacent to the flange it is provided with a rectangular circumferential groove in its cross section and in the axial section.

Two straddling jaws are provided adjacent to the circumferential groove. The jaws are rectangular in cross section and are tapered in a wedge like fashion at their free ends. The cross section of the straddling jaws extend on all sides of the cross section of the circumferential groove. For assembling purposes the mounting element is inserted at first through a rectangular opening in the first sheet metal, whose cross sectional dimensions are larger than the cross section of the groove but smaller than the cross section of the straddling jaws. While the pin part is removed from the central bore of the eye, the straddling jaws can yieldingly engage, so that the first sheet metal snaps into the groove. Subsequently, the pin part is inserted axially into the central bore after separating the nominal breaking locations, wherein it is held axially nondisplaceable by means of a snap element and thereby securing the eye permanently on the first sheet metal. The straddling jaw may then be inserted through a larger rectangular opening of the second sheet metal. A rectangular end section of the pin part engages between the two straddling jaws. By turning the pin part the two straddling jaws can be spread from their untensioned positioned, so that their side walls are forcibly locked in the opening of the second sheet metal.

This known mounting element is not suitable for toy construction elements, because it is permanently snapped in on the first sheet metal and because it requires two differently shaped sizes of holes in the two pieces of sheet metals. Further, the mounting element is not suitable for centering the two pieces of sheet metals with respect to each other, because the first piece of sheet metal has free play in the groove. Therefore, the two pieces of sheet metals must be centered with respect to each other by additional parts. While the straddling jaws only engage tensionally in the opening of the second sheet metal a precise interengaging position of the two pieces of sheet metals is not assured. When the mounting element remains for a long period of time in the straddled position, they lose their elasticity due to "creep" of the synthetic materials. Under these circumstances even when the pin part is returned to its release position, the straddling jaws remain in their straddled position and the mounting element can only be removed from the opening of the second sheet metal piece with considerable difficulty and often with destroying the pin. A further disadvantage of this known mounting element is that it protrudes substantially at the rear face of the second sheet metal piece. This makes the device additionally unsuitable for use with toy-construction elements.

A similar mounting element with the same disadvantages is disclosed in Swiss Patent Number 591,638. In contrast to the aforementioned mounting element the pin part in this case is displaced axially between a locking position and a release position, instead of being turned. In addition, the two differently sized openings in the sheet metal pieces to be connected are cylindrical instead of rectangular.

SUMMARY OF THE INVENTION

In contrast to these known mounting means the device in accordance with the present invention can be easily removed from both construction elements. In contrast to the known mounting elements the two construction elements are positioned radially and axially with each other in an exact manner, because the cylindrical shaft section centers the two construction elements relatively with respect to each other while the small edge shoulder positively locks the second construction element. The small edge shoulder does not protrude, so that it does not interfere with attaching additional construction elements. Because the radially elastic end part of the socket is secured in its locked position in a nontensioned state, prolonged maintenance in this locked position does not result in creep of the material. Therefore, the connecting device may be left for prolonged times in the unlocked or the locked position.

The invention also relates to a toy-construction element with at least one cylindrical bore for receiving the cylindrical socket of the connecting device.

BRIEF DESCRIPTION OF THE DRAWINGS

The present invention will now be explained in detail in conjunction with the drawings in which.

DETAILED DESCRIPTION OF THE PREFERRED EMBODIMENTS

Figure 1:
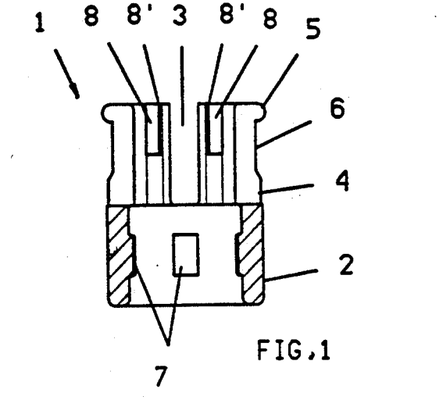
FIG. 1 is a longitudinal sectional view through a socket of a first embodiment of the inventive connecting device.
Figure 2:
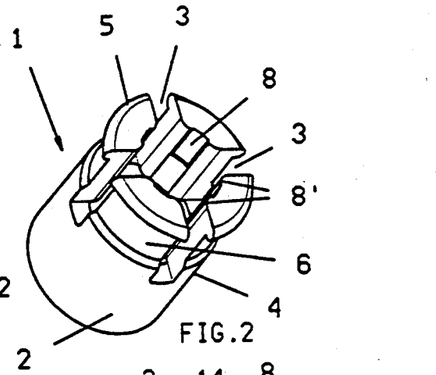
FIG. 2 is a perspective view of one face of the socket of FIG. 1.

The socket 1 of the connection device in accordance with the present invention consists of a rigid cylindrical part 2 and a part 4 provided with four longitudinal slots 3 which render part 4 radially elastic. The longitudinal slots 3 are angularly offset by about 90°. Part 4 is provided at its free end with an outer slotted edge shoulder 5. The elastic part 4 is provided with a circumferential groove 6 having a reduced outer diameter which assures the radial elasticity of the socket end. The axial length of the circumferential groove 6 is smaller than the length of part 2. In the area of the rigid part 2 of socket 1 the cylindrical inner wall thereof is provided with four rectangular protrusions 7. In the area of the elastic part 4 the inner wall is provided with four rectangular recesses 8 which extend to the end of the socket and are provided with an edge shoulder limited towards both sides in the circumferential direction by inwardly extending radial protrusions 8'.

Figure 3:
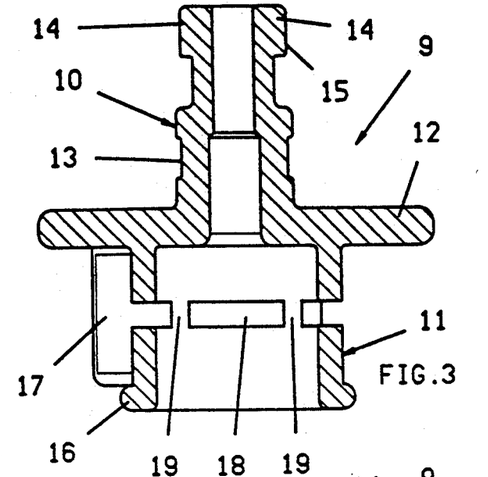
FIG. 3 is a longitudinal view through a locking element of the connection device.
Figure 4:
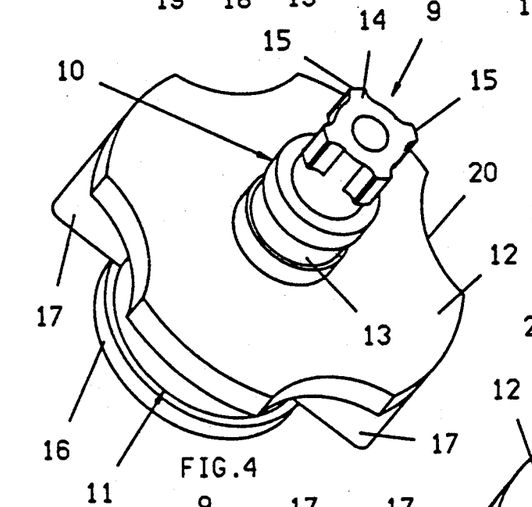
FIG. 4 is a perspective view of one face of the locking element of FIG. 3.

The locking element 9 illustrated in FIGS. 3 and 4 is provided with a socket part 10 and a handle 11 which is formed in a unitary piece by means of a plate like flange 12 with socket part 10. As can be seen in particular from FIG. 4, the socket part 10 is provided with a first section which is substantially cylindrical and provided with an annular like recess or groove 13 into which the rectangular protrusions 7 of FIGS. 1 and 2 fit. Beyond this cylindrical section a second section is provided in the form of an end area provided with four longitudinal ribs 14. The longitudinal ribs 14 have plane outer faces 15 dimensioned to fit into the rectangular recesses 8 of the socket 1 of FIGS. 1 and 2. The handle 11 is formed as a socket and for its axial actuation it is provided with an outer edge shoulder 16 and for its rotational actuation it is provided with two wings 17. The cylindrical inner wall of the handle 11 is provided with four annular like groove sections 18 which are separated in the circumferential direction by shorter rib sections 19. The width of these rib sections 19 are equal to the width of longitudinal slots 3 of socket 1 of FIGS. 1 and 2. Plate like flange 12 is provided with circular cuts 20 for aesthetic purposes and to facilitate the handling thereof.

For forming the connection device in accordance with the invention the socket part 10 of the locking element 9 (FIGS. 3,4) is inserted into socket 1 (FIGS. 1,2). The radially extending protrusions 7 of the socket 1 lock into the annular like recess 13 of the socket part 10 of locking element 9, after overcoming a certain elastic resistance. In this condition the socket 1 and the locking element 9 can no longer be displaced in the axial direction with respect to each other, however they are rotatable with respect to each other. The axial length of socket 1 and the socket part 10 of the locking element 9 are compatible with respect to each other in that in the condition of the axial locking of socket 1 with locking element 9 the edge of the socket 1 disposed opposite the edge shoulder 5 abutts the plate like flange 12 of the locking element 9, on the one hand, and the end side front face of the socket part of the locking element 9 is flush with the end side front face of the edge shoulder 5 of socket 1, on the other hand.

Figure 5:
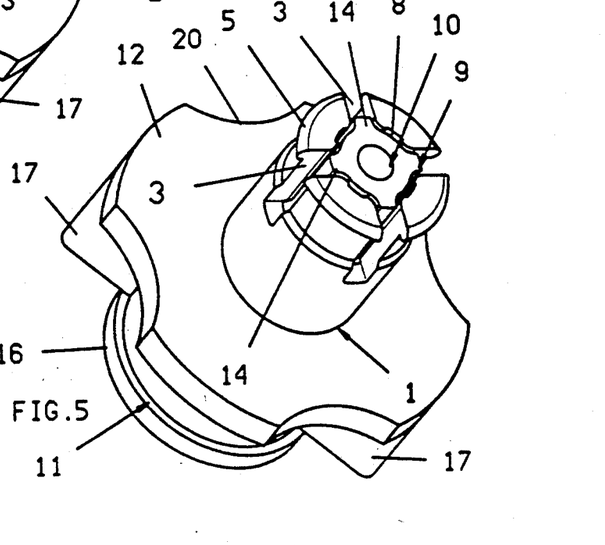
FIG. 5 is a perspective view of one face of a connecting device in accordance with FIG. 2 and the inserted locking element in accordance with FIG. 4.
Figure 6:
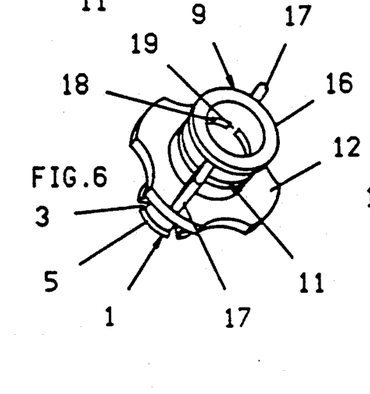
FIG. 6 is a perspective view of the other face of the connecting device in accordance with FIG. 5.

FIGS. 5 and 6 illustrate perspective views of both faces of the connection device in accordance with the described inserting of the locking elements 9 into socket 1. In particular, from FIG. 5 it can be seen that the longitudinal ribs 14 of the socket part 10 of the locking element 9 are positioned in a radial direction on the inner part of longitudinal slots 3 of socket 1. Since the radial dimension of the longitudinal ribs 14 is larger by a small amount than the radius of the cylindrical, slotted and elastic part 4 of socket 1 one obtains the angular position of the locking element 9 with respect to socket 1 during insertion of the locking element 9 into socket 1 automatically, since in this position the lowest mechanical resistance has to be overcome, as can be seen from FIG. 5.

Figure 19:
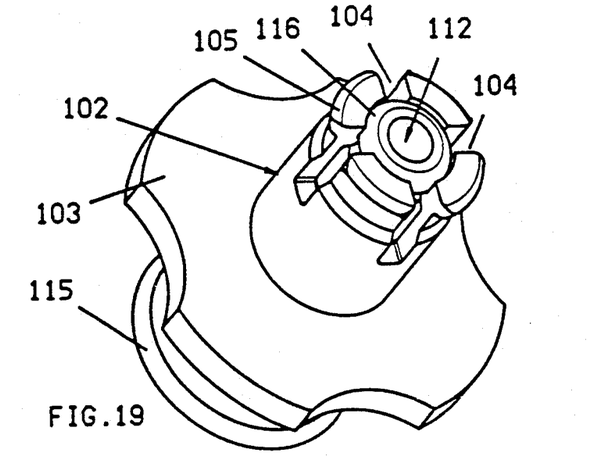
FIG. 19 is a perspective view of one face of the connection device with a socket in accordance with FIG. 16 and an inserted locking element in accordance with FIG. 18.
Figure 20:
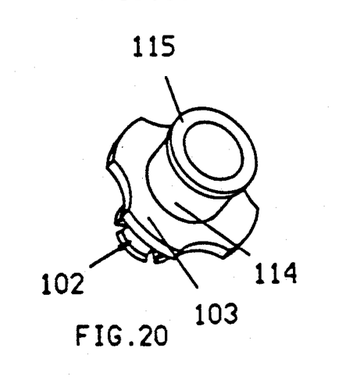
FIG. 20 is a perspective view of the other side of the connection device in accordance with FIG. 19.

Reference is now made to FIGS. 7-12. As may be seen two construction elements 21,22 are provided with an annular like recess 23 at each end. As distinct from conventional embodiments of the annular like recesses 23 at the bore ends of the construction elements 21,22 the recesses 23 in this case are provided with four extended cams 24 offset by 90° with respect to each other, which extend in the recesses 23 radially inwardly to the cylindrical inner wall of the bore and in the circumferential direction have a width of no more than the width of longitudinal slots 3 of socket 1. These cams 24 can be seen in FIGS. 8, 19 and 12.

Figure 7:
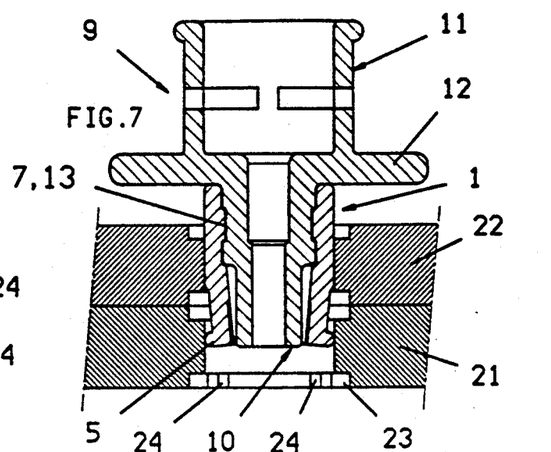
FIG. 7 is a sectional view through two connected construction elements in accordance with a first embodiment of the invention taken along lines VII—VII of FIG. 8.
Figure 8:
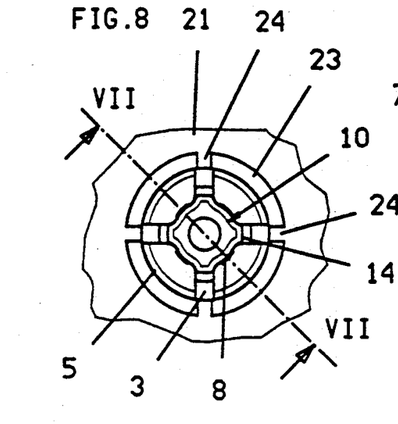
FIG. 8 is a front elevational view of the connection device of FIG. 7.

In FIGS. 7 and 8 a first position of the connection device consisting of socket 1 and the locking element 9 is illustrated during insertion into the bores of the two construction elements 21 and 22. As can be seen from FIG. 7, the plug like locking element 9 is already inserted into socket 1, as had been explained before, and in this position it is held axially nonseparable, but rotatable, as a result of protrusions 7 of socket 1 and the recesses 13 of the socket part 10. When inserting the connection device into the bores of the construction element 21 and 22 in accordance with FIG. 7 by means of an axial force exerted on handle 11 of the locking element 9 the socket 1 displaces also in the mentioned bores because the edge shoulder 5 of socket 1 may be pushed inwardly.

Figure 9:
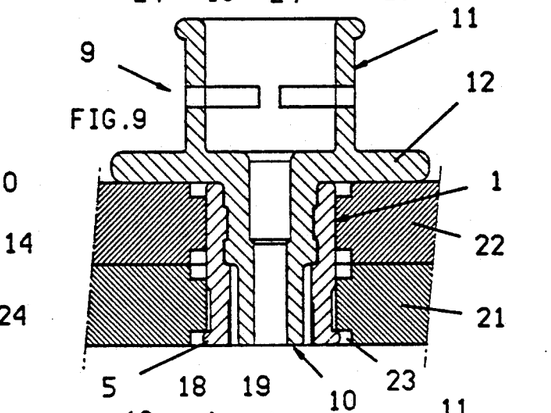
FIG. 9 is a sectional view similar to FIG. 7 but in a successive position within the bores of the construction elements taken along the lines IX—IX of FIG. 10.

During progressive longitudinal movement the socket 1 reaches the end position illustrated in FIG. 9, whereby:

the edge shoulder 5 of socket 1 is elastically locked in the outer face recess 23 of construction element 21;
the extended cams 24 in recess 23 are disposed in the longitudinal slots 3 of socket 1; and
the flange 12 of the locking element 8 is supported on the opposite outer face of construction element 22.

In this position the construction elements 21 and 22 are connected by socket 1, however they may easily be separated.

Figure 10:
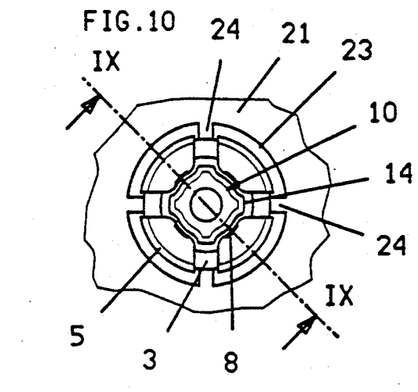
FIG. 10 is a front elevational view of the connection device.

For securing or locking the connection of the two construction elements 21, 22 by means of socket 1 the locking element 9 is now turned from its position in FIGS. 9 and 10 in either a clockwise or counterclockwise direction. Thereby, socket 1 is restrained from rotation relative to construction elements 21, 22 since the cams 24 of construction element 21 engage the longitudinal slots 3 of socket 1. Thus, only the locking element 9 rotates with its socket part 10 disposed in socket 1.

During rotation of handle 11 and of the socket part 10 of the locking element caused thereby, the longitudinal ribs 14 (as can be seen from FIG. 5) come into engagement with the cylindrical slotted inner face of socket 1 and thereby push the individual segments of the socket which are provided with edge shoulder 5 radially outwardly. This is made possible by the circumferential groove 6 and that the edge shoulder 5 can withdraw into the recess 23 of the construction element 21. During the continuous rotating movement the longitudinal ribs 14 snap into the corresponding rectangular recesses 8 of the inner wall of socket 1, which is noticeable and also audible when rotating handle 11. Simultaneously, the elastic part 4 of socket 1 which is provided with slots 3 snaps back into its cylindrical nontensioned position, as illustrated in FIGS. 11 and 12.

In this position, (see FIG. 11), the edge shoulder 5 of the socket 1 still engages recess 23 of construction element 21. However, since a radial yielding compression of the elastic part 4 and in particular of edge shoulder 5 of socket 1 is impossible, because the longitudinal ribs 14 of the rigid socket part 10 of the locking element 9 prevent such a radial movement the socket 1 is firmly anchored in construction elements 21,22. This is also the case because in the described position the locking element 9 cannot be pulled out of socket 1 or moved because of the axial solid connection by means of protrusions 7 of socket 1 and the annular like recess 13 of the locking element 9.

Figure 11:
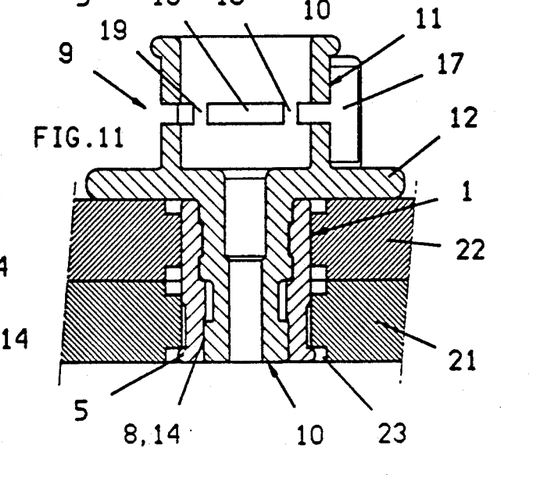
FIG. 11 is a sectional view taken along line XI—XI of FIG. 12 of the connection device in the bores of the construction elements.
Figure 12:
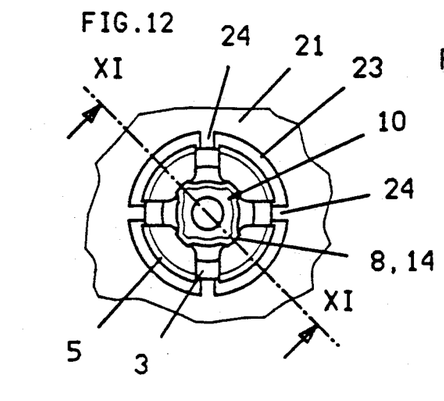
FIG. 12 is a front face view of the connection device of FIG. 11.

To release the connection of construction elements 21 and 22 illustrated in FIG. 11, the locking element 9 is rotated by means of handle 11 in either the clockwise or counterclockwise direction by 45° so that the longitudinal ribs 14 of the locking element 9 again are disposed in the longitudinal slots 3 of socket 1 and extend into the same, as illustrated in FIGS. 9 and 10. The locking element 9 together with the socket 1 may then be pulled out from the bores of construction elements 21,22, whereby the construction elements are again separated from each other.

As previously mentioned, the cylindrical inner wall of the handle 11 which is open to the outside is provided with four annular like groove sections 18 which are separated by rib sections 19 of the cylindrical inner wall of handle 11. The purpose of this design of the cylindrical hollow space of handle 11 is that the edge shoulder 5 of the socket I of a further connecting device of the subject type can be inserted. When a connection device, as illustrated in FIG. 5, is inserted into the hollow space of handle 11 in accordance with FIGS. 3 and 6, the slotted edge shoulder 5 of socket 1 of this second connecting device locks into the groove sections 18 of handle 11 of the first connection device. Thereby, the rib sections 19 of the cylindrical inner wall of handle 11 of the first connection device perform the same function as the aforedescribed cams 24 in the recess 23 of the construction element 21 (FIGS. 8, 10, 12), e.g., by engaging the longitudinal slots 3 of the socket 1 to prevent rotation of socket I when the locking element 9 is rotated, so as to lock socket 1. The groove sections 18 and the rib sections 19 permit a further connection device of the same type to be mounted in accordance with FIGS. 7, 9 and 11.

Heretofore, in conjunction with FIGS. 7 to 12, embodiments of the inventive connection device and construction elements which can be used therewith were described. These embodiments are based on the fact that a rotating of socket 1 of the connection device in the bores of the construction elements upon turning the locking element 9 of the connection device is prevented in that radial cams 24 of the one construction element 21 engage the end side longitudinal slots 3 of socket 1. In the following, further embodiments of the connection device and the construction elements are described, wherein the rotation is prevented by a different design of the locking device and/or the construction elements or by other means than the ones of FIGS. 7 to 12.

Figure 13:
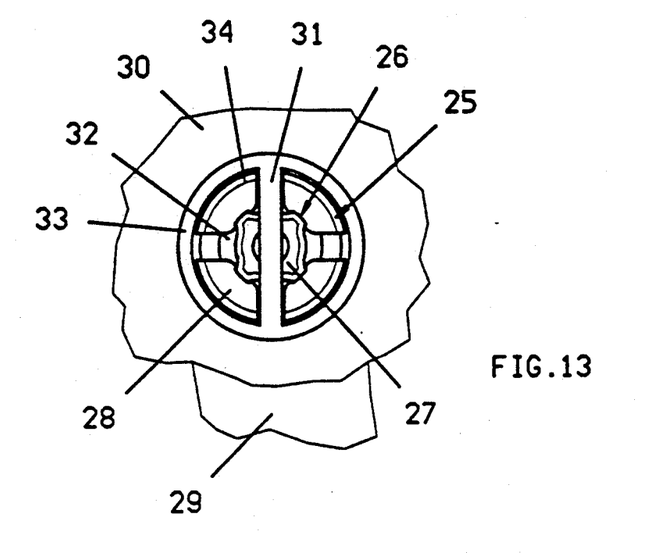
FIG. 13 is a front elevational view of a second exemplified embodiment.

In the embodiment illustrated in FIG. 13 the connection device again consists of a socket 25 and a locking element 26 which is inserted into socket 25 and is rotatable but is fixed in the axial direction. The socket 25 as well as the locking element 26 are actually designed in the same manner as socket I of the locking element 9 of FIGS. 1 to 12. The only difference is that the outer end face 27 of the locking element 26 is offset inwardly with respect to the outer end face 28 of socket 25, while in the embodiment in accordance with FIGS. 5, 7, 9 and 11 these end faces are disposed in the same plane.

In the subject embodiment there is a substantial difference with respect to that of FIGS. 7 to 12 in one construction element 30 of the construction elements 29,30 which are connected with each other by the socket 25 and the locking element 26. The construction element 29 corresponds to construction element 22 of FIGS. 7, 9 and 11. However, the construction element 30 is provided with a diametrically extending transverse rib 31, instead of radial cams 24, whose width is at most equal to the width and preferably somewhat smaller than the width of the longitudinal slots 32 of socket 25. Other than that the construction element 30 is again provided with an annular like recess 33 wherein the edge shoulder 34 of socket 25 locks.

It can be seen that the transverse rib 31 of FIG. 13 performs the same function as the radial cams 24 (of FIGS. 7, 8, 10 and 12), in that the transverse rib 31 during the complete insertion of the connection device, consisting of the socket 25 and the locking element 26, into the bores of the superimposed construction elements 29 and 30 engagers into two diametrically opposed longitudinal slots 32 of socket 25. In order to enable such an engagement, the end face 27 of the locking element 26 with respect to the end face 28 of the socket 25 is offset toward the inside. The transverse rib 31 may have a larger dimension in the axial direction and may be formed as a transverse wall.

Figure 14:
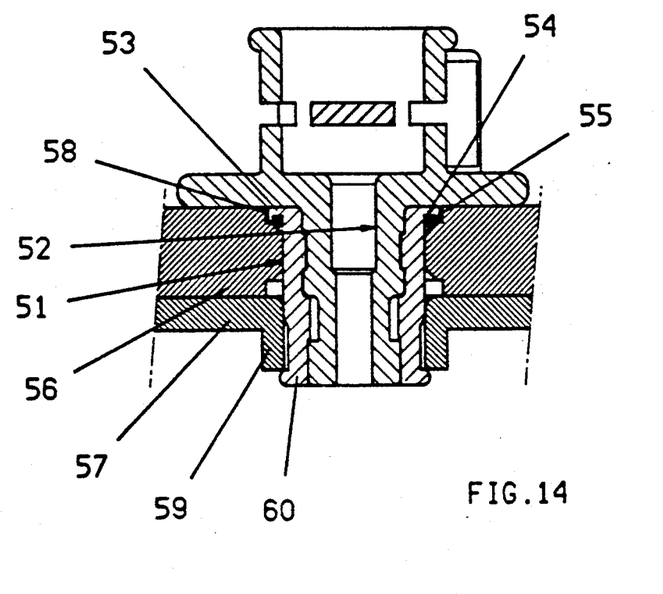
FIG. 14 is a sectional view through two construction elements connected with a third construction element.

Finally, in accordance with FIG. 14 a still further embodiment is depicted. In this embodiment the locking feature of the socket is based on the principle of friction.

From FIG. 14 it can be seen that the connection device comprises a socket 5 and a locking element 52 which is rotatably mounted in the socket 51, but axially fixed. Socket 51 differs from the socket of FIGS. 1 and 2 in that it is provided with a circular flange 53 at its nonslotted end. The locking element 52 mounted in socket 51 is the same as the locking element 9 of FIGS. 3 and 4.. Furthermore, socket 51 is provided with an annular like groove 54 on the inner face of flange 53, within which an elastic O-ring 55 with a high friction coefficient is received.

In accordance with FIG. 14 the connection device consisting of socket 51 and locking element 52 connects two construction elements 56 and 57, whereby the one construction element 56 is a rod provided with annular like recesses 58 and the other construction element 57 is a part of a square like construction block with an inner collar 59. The connection device is completely inserted into the bores of the two construction elements 56 and 57, so that the socket 51 at its one slotted end with edge shoulder 60 engages over the front face of collar 59 of construction element 57. At the other end of socket 51 the flange 53 of socket 51 pushes the elastic ring 55 onto a face of the annular like recess 58 of construction element 56. Thereby, ring 58 acts as a friction element and prevents a rotating movement of socket 51 within the bore of the construction element 56. Therefore, the illustrated connection device can be locked or released by turning the locking element 52 in the already explained manner, without a simultaneous turning of socket 51.

Instead of the construction element 57 being formed as a construction block with an inner collar 59, various construction elements are connectable with the connection device in accordance with FIG. 14. In particular, the construction element 57 may be the same rod as the construction element 56. In any case, it is advantageous that the construction elements are randomly usable and combinable, e.g. for inserting of shafts, since their bores do not have to have interfering protrusions. However, the handling of the connection device in accordance with FIG. 14 is somewhat cumbersome. During mounting and during locking a relatively strong pressure must be exerted on the handle of locking element 52, so as to compress the elastic ring 55 of socket 51 into the recess 58 of the construction element. Thereupon, the handle of the locking element 52 must be rotated while maintaining the exerted pressure so as to lock socket 51.

The axial length of the described sockets 1,25,51 of FIGS. 11, 13 and 14 and the thickness of the construction elements 21,22; 29,30 and 56,57 are related with respect to each other, since the construction elements must be disposed between the slotted edge shoulder of the given socket and the flange of the associated locking element. Accordingly when using the subject connection device in a construction set with standardized construction elements the length of the socket including the slotted edge shoulder should be equal to a multiple of the smallest thickness of the construction element. If the prevailing thickness of the construction element deviates from the module, as is the case with construction element 57 of FIG. 14, for example, then this deviating smaller thickness of the construction element together with the axial dimension of collar 59 should again result in the mentioned minimum and standardized thickness.

From the aforementioned explanations of different embodiments of the connection device in accordance with the invention and the adaptable construction elements it is believed that on balancing the advantages and disadvantages of the various embodiments the construction elements explained and illustrated in FIGS. 1 to 6 and FIGS. 7 to 12 is the most advantageous. It is easily handled and requires a simple rotation and pushing movement without any application of force, which may be difficult for young children. The construction elements is also quite versatile, since the end face recesses 23 with the radial cams 24 (see FIGS. 7 to 12) do not impair the assembly of given construction elements and the use of feed through shafts.

Figure 15:
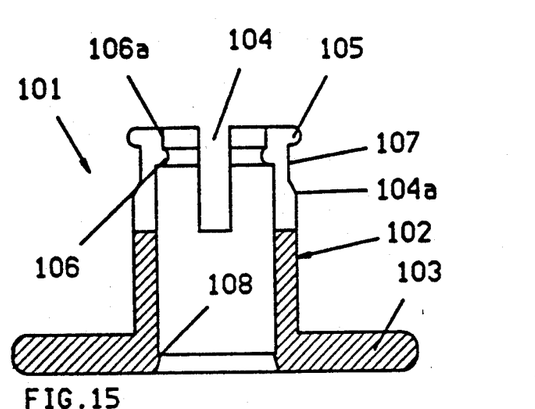
FIG. 15 is a longitudinal sectional view through a socket of another embodiment of the connection device.
Figure 16:
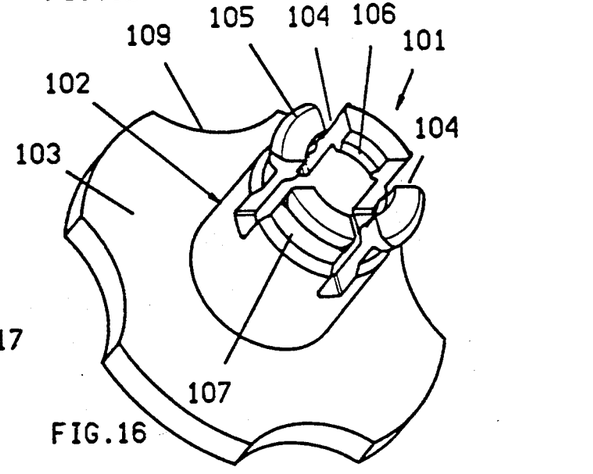
FIG. 16 is a perspective view of one face of the socket of FIG. 15.

The socket 101 of the connection device in accordance with the invention illustrated in FIGS. 15 and 16 is provided with a substantially cylindrical socket part 102 and an extended plate like flange 103. The end part 104a of socket 101 facing away from flange 103 is provided with four longitudinal slots 104 which cause a radial elasticity for this socket end. On socket part 104a of this socket end an outer edge shoulder 105 and an inner annular like protrusion 106, offset in longitudinal direction, are also provided. The protrusion 106 extends over a cylindrical inner face 106a at the free end part 104a. The socket end is provided with a circumferential groove 107 disposed between the edge shoulder 105 and the cylindrical socket part 102 which assures the radial elasticity of the socket end and enables an elasticity of the socket end radially outward. The cylindrical inner wall of socket 101 is provided with an annular like protrusion 108 at the end of flange 103. The plate like flange 103 is provided with circular like cuts 109 which not only have an aesthetic appeal but also function to introduce the connection devices into bores in construction elements which may be provided with protruding coupling pins.

Figure 17:
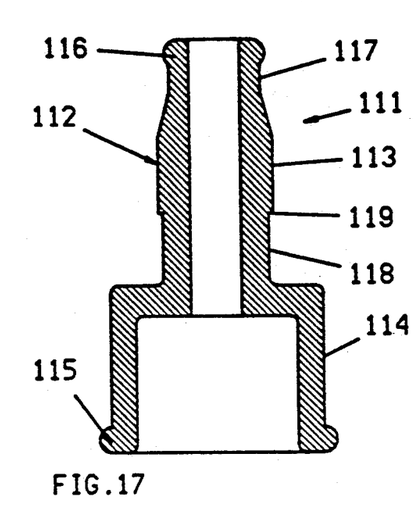
FIG. 17 is a longitudinal sectional view through a locking element of the connection device in accordance with FIGS. 15 and 16.
Figure 18:
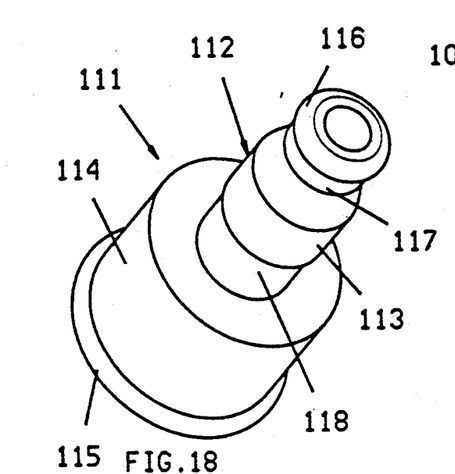
FIG. 18 is a perspective view of the first face of the locking element of FIG. 17.

A plug like locking element 111 for socket 101 of FIGS. 15 and 16 is illustrated in FIGS. 17 and 18, and comprises a socket part 112 with a cylindrical section 113 and an extended handle 114 with an edge shoulder 115. The substantially cylindrical socket part 112 is provided with an edge shoulder 116 on its free end with a subsequent section 117 having a reduced outer diameter. In the area of the handle 114 the socket part 112 is also provided with a section 118 having reduced outer diameter with an annular like offset 119.

The relative diameters of different sections of the socket 101 in accordance with FIG. 15 and the locking element 111 in accordance with FIG. 13 are preferably selected as follows:

the outer diameter of the cylindrical section 113 of the socket part 112 of the locking element 111 (FIG. 17) is equal to or slightly smaller than the inner diameter of the cylindrical part 102 of socket 31 (FIG. 15);

the outer diameter of the edge shoulder 116 of the socket part 112 of the locking element (FIG. 17) is approximately equal to the inner diameter of the cylindrical inner face 106a of socket 101 at the end thereof with edge shoulder 105 (FIG. 15).

the circumferential groove 107 is axially shorter than the cylindrical socket part 102 however longer than the edge shoulder 105;

the offset 119 of the socket part 112 of locking element 111 (FIG. 17) relates to the protrusion 108 of socket 101 (FIG. 15) in such a manner that the protrusion 108 and the offset 119 come into superimposed contact with each other; and the length of the socket part 112 of the locking element 111 (FIG. 17) is equal to the total length of socket 101 (FIG. 15).

Accordingly, the locking element 111 of FIG. 17 can be inserted into socket 101 of FIG. 15, until the end face of the edge shoulder 116 of the locking element 111 is flush with the end face of the edge shoulder 105 of socket 101 or until the inner face of handle 114 of the locking element 111 engages the outer face of flange 103 of socket 101. Naturally, this insertion must be performed by overcoming a certain mechanical resistance provided by the protrusion 108 of socket 101. The protrusion 108 of socket 101 together with offset 119 causes the locking element 111 and socket 101 not to become separated from each other; they can only be longitudinally displaced over a limited path, as is explained in the following in conjunction with FIGS. 21 to 23.

Figure 21:
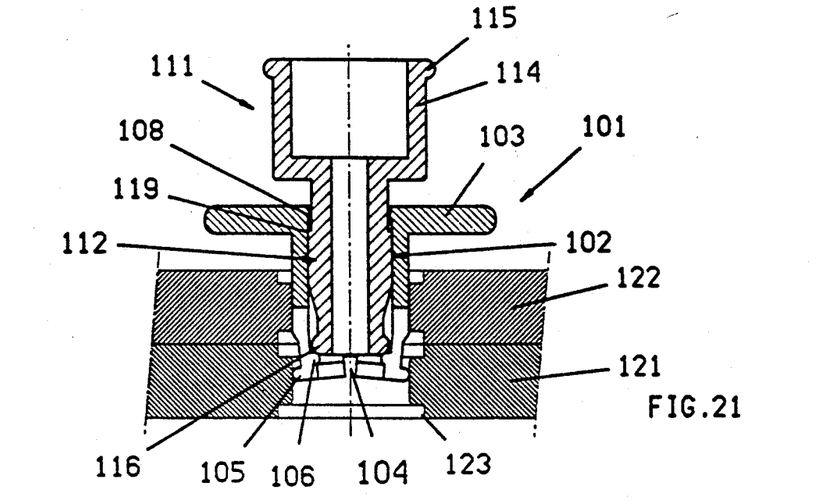
FIG. 21 is a sectional view through two construction elements to be connected with each other in accordance with FIGS. 15 to 20 during introduction of the connection device into the bores of the construction elements.
Figure 22:
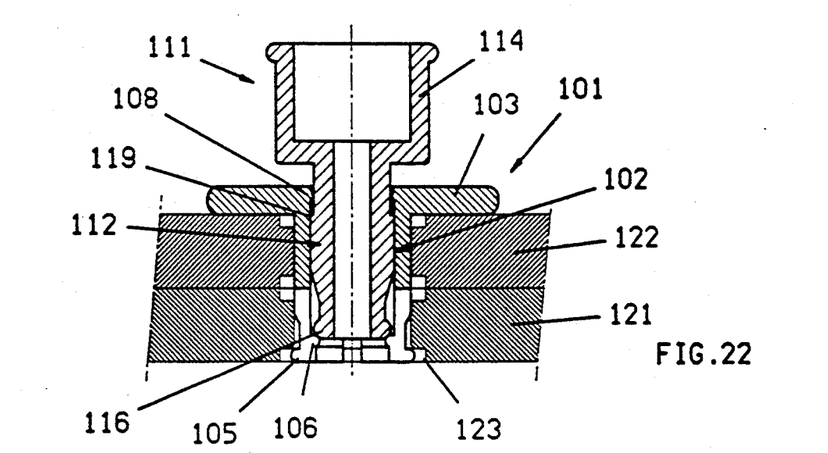
FIGS. 22 and 23 are sectional views corresponding to FIG. 21 in successive positions in the bores of the construction elements.
Figure 23:
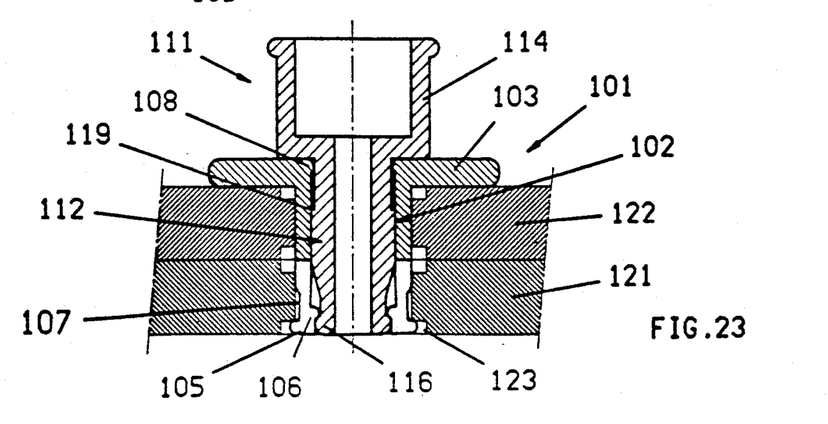

The operation of the subject connection device for connecting two rod like construction elements 121 and 122 each with one bore is illustrated in FIGS. 21 to 23. As shown, the two construction elements 121,122 are provided with an annular like recess 123 at both sides of their bore ends in a known manner.

In FIG. 21 a first position of the connection device is illustrated consisting of the socket 101 and the locking element 111. As can be seen from FIG. 21, the plug like locking element 111 is inserted into socket 101, and inseparably held therein, due to protrusion 108 of socket 101 and offset 119 of the locking element Ill. During the insertion of the connecting device into the bores of the construction elements 121 and 122 according to FIG. 21 by an axial force exerted on the handle 114 of the locking element 111 socket 101 is also displaced, since the outer edge shoulder 116 of the locking element 111 pushes on the inner annular like protrusion 106 of socket 101.

During a further longitudinal movement socket 101 reaches the end position illustrated in FIG. 22, whereby the edge shoulder 105 of socket 101 is elastically locked into the outer face recess 123 of construction element 121, on the one hand, and flange 103 of socket 101 engages the opposite outer face of construction element 122, on the other hand. In this position the construction elements 121 and 122 are connected with each other by socket 101, however separation of the construction elements 121,122 would be possible with a relatively low pulling force.

For securing or locking the construction elements 121,122, the locking element 111 is now pushed further into socket 101. Thereby, the outer edge shoulder 116 of the locking element 111 can slide over the inner protrusion 106 of socket 101, because the slotted socket end can expand radially into the recess 123 of construction element 121 with its outer edge shoulder 105 during this procedure. Thereupon, the edge shoulder 116 reaches the outer face of the inner protrusion 106 of socket 101, as can be seen in FIG. 23, whereby the slotted socket end radially snaps back to the inside.

With regard to the connection and locking arrangement illustrated in FIG. 23 the following resulting facts are provided:

a radially inwardly biasing of the open end of the socket and thereby a releasing of the edge shoulder 105 of socket 101 from recess 123 of construction element 121 is impossible due to the radial locking of the edge shoulder 116 of the rigid locking element 111;

the locking cannot be released by any separating force exerted in any manner on the construction elements 121,122 because the handle 114 of the locking element 111 is supported on flange 103 of socket 101 and thereby the separating force cannot influence the locking position of the locking element 111 with respect to socket 101;

the end faces of the construction element 121, of socket 101 and the locking element ill are all disposed in the same plane, so as not to interfere with further construction with other construction elements;

the two construction elements 121,122 are commonly centered by the cylindrical socket part 102; and all parts are tightly superimposed with each other without any intermediary spaces.

Releasing the connection between the construction elements 121 and 122 illustrated in FIG. 23, is only possible by pulling the locking element 111 out of its locked position by means of handle 114, on the one hand, and to remove the socket 101 from the bores of the construction elements 121,122, on the other hand. During this pulling movement the edge shoulder 116 of the locking element 111 slides over the protrusion 106 of socket 101 (FIG. 23) in a first phase, which is made possible due to circumferential groove 107, because the outer edge shoulder 105 at the end of socket 101 can radially expand into the recess 123 of construction element 121. During a further pulling of handle 114 the offset of the locking element 111 engages protrusion 108 of socket 101, so that during a continued pulling of the handle 114 the socket 101 is pulled from the bores of the construction elements 121,122.

From the illustrations of FIGS. 21 to 23, it can also be seen that the sections with reduced diameter of socket 101 and the locking element 111 (groove 107 in FIG. 15 or section 117 in FIG. 17) assure an interference free actuating of the subject connection device.

From the aforementioned explanations it can be seen that the structures of the connection device in accordance with the invention, may be made from plastic and are very simple. In addition, handling of the connection device is simple even for untrained users, and thus is particularly well suited for young children.

Accordingly, it should be emphasized that the completion of the described locking arrangement is noticeable and results in an audible click and that the forces required for inserting or releasing of the connection device are very low, notwithstanding a firm lock being attained.

When the connection device in accordance with the invention is used outdoors there is a problem of water, dirt, sand or the like, interfering with the function of the elements. A device designed to operate in such an environment is disclosed in accordance with the embodiment illustrated in FIG. 24.

Figures 24, 25, 28:
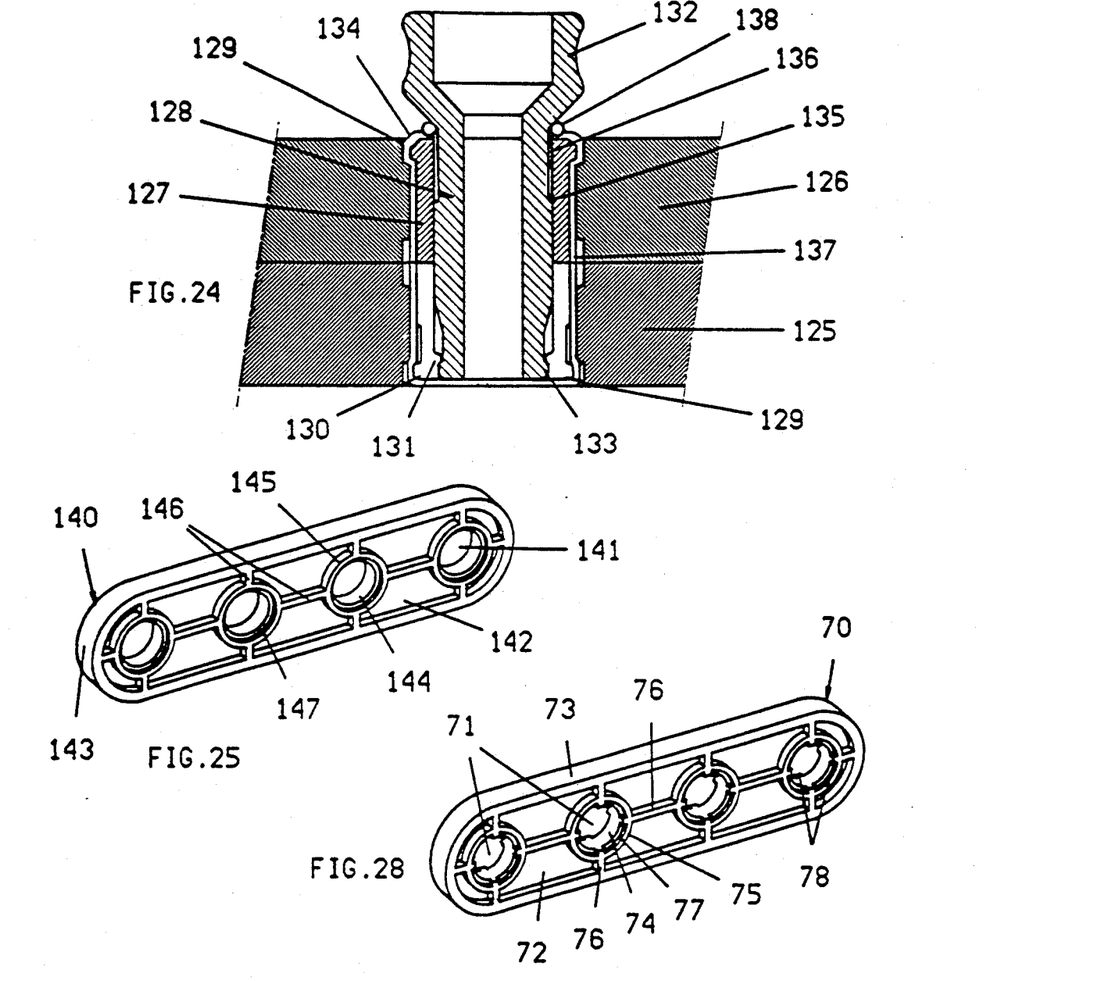
FIG. 24 is a sectional view through a further embodiment of the connection device in accordance with the invention with a sealing cap.
FIG. 25 is a perspective view of a construction element in the form of a rod in accordance with the invention.
FIG. 28 is a perspective view of a rod like construction element with a plurality of cylindrical bores which is formed for use with the connection device in accordance with FIGS. 1 to 6.

In accordance with FIG. 24 two construction elements 125 and 126 are provided each with a bore and held together by a connection device which in turn comprises a socket 127 inserted into construction elements 125,126 and a locking element 128 inserted into socket 127. As previously described, the construction elements 125,126 are provided with annular like recesses 129 at both faces of the bore. Again, socket 127 is slotted at its end area and provided at its end with an outer edge shoulder 130, as well as on its inner face with an annular like protrusion 131. The locking element 128 has a handle 132 and at its open end of its cylindrical part an outer edge shoulder 133. The design of the connection device of FIG. 24 corresponds completely to the embodiment of FIGS. 15 to 23, with respect to its structure and its function.

The difference between this embodiment and that of FIGS. 15 to 23 is the omission of flange 103 of socket 101 (as shown in FIG. 15). Instead the socket 127 in accordance with FIG. 24 is provided with a further edge shoulder 134 which is disposed in the annular recess 129 of the other construction element 126 and therefore performs the same abutment function as flange 103.

A further difference is that an elastic cap 137 is inserted over the socket 127 and the locking element 128. The elastic cap 137 has an edge shoulder 138 for securing the unit supported on the end area of socket 127 and the handle 132 of the locking device 128. The elastic cap 137 may be made of a synthetic material, The mode of operation of the connection device illustrated in FIG. 24 corresponds with the aforementioned explanation in conjunction with FIGS. 21 to 23. Thereby, the unit of socket 127 and the locking element 128 are always tightly sheathed by cap 137, even when the locking element 128 is axially displaced within socket 127. Hence, the mentioned unit is protected against infiltration of foreign matter between socket 127 and the locking element 128.

It is contemplated that toy construction elements which are to be connected with the connection device in accordance with the invention, have at least one cylindrical bore of a uniform diameter although they may naturally have any given shape which fit into the construction set, for example, they may be different size, rods, beams, plates, etc.

FIG. 25 depicts a perspective view of a rod 140 with four bores 141 which are disposed at a distance of 1 M (where M=module distance of the construction set), whereby rod 140 has a total length of 4 M and a width of 1 M. For reasons of manufacturing and material savings rod 140 is not solid but rather has a relatively thin separating wall 142 and an extended edge 143 having a thickness of ¼ M of rod 140. Each bore 141 is defined by a casing like cylindrical part 144 being extending on separating wall 142 and surrounded by an outer reinforcement ring 145. The reinforcement rings 145 are connected with each other and with the edge 143 by means of reinforcement ribs 146, whereby the edge 143, the rings 145 and the ribs 146 have outer faces at both sides of separating wall 142 which are disposed in the same plane. In the axial direction the length of the cylindrical part 144 of each bore 141 is smaller than the total thickness of ¼ M of the illustrated rod 140, so that at the end of the bores at both sides of the separating wall 142 an annular like recess 147 is provided. With reference to FIGS. 21 to 23 the annular like recess 147 is defined for receiving the edge shoulder 105 of socket 101 of FIG. 15.

In order to connect two rods in accordance with FIG. 25, a connection device in accordance with FIG. 21 is used, for example, whereby the socket part 102 of socket 101 has a length including the edge shoulder 105 of ½ M (twice the thickness of each rod of FIG. 25). If a connection device in accordance with FIG. 24 is used, the total length of the socket including the two edge shoulders 130 and 134 also is approximately ½ M.

Figure 26:
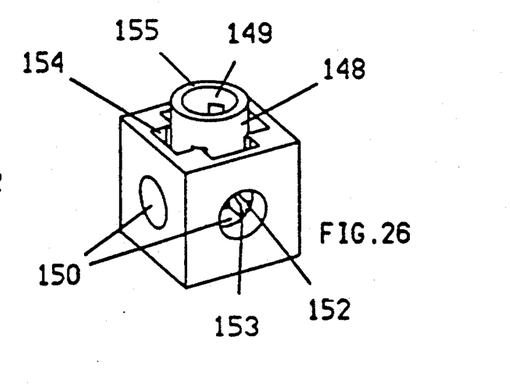
FIG. 26 is a perspective view of one face of a construction element in the form of a construction block.
Figure 27:
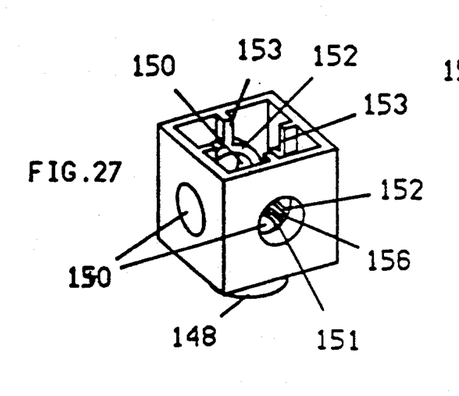
FIG. 27 is a perspective view of the other face of the construction block of FIG. 26.

A further construction element is illustrated in FIGS. 26 and 27. As can be seen the construction block substantially consists of a cube with an edge length of 1 M (M=unit module of the construction set). The construction block is hollow and has one side open. At the side opposite of the open side the construction block is provided with an extended coupling pin 148, such that the construction block can be coupled on both sides with other similar construction elements.

The coupling pin 148 as well as the four lateral walls of the construction block are each provided with a bore 149 or 150 which all have the same diameter. As can be seen from FIG. 27, the inner end of the coupling pin 148 extending into the hollow space of the construction block is provided with an annular like recess 151. The lateral bores 150 each end in the hollow space of the construction block at an extended annular shoulder 152. Each annular shoulder 152 is provided with a rib 153 extending to the edge of the open side of the construction block. The four ribs 153 cause a reinforcement of the somewhat weakened side walls of the construction block due to bores 150 and simultaneously form counter coupling members for coupling the construction block with the coupling pin of another construction element. The openings 154 seen from FIG. 26 are only provided for manufacturing reasons to reduce material. Naturally, the construction block of FIGS. 26,27 is made in one piece form a plastic material.

Accordingly, with respect to the construction block of FIGS. 26 and 27, further construction elements may be mounted at five of its faces by means of the connection device in accordance with the invention, whereby at the face of the coupling pin 148 the construction element to be connected will support on coupling pin 148. Corresponding to the aforementioned explanations the length of the coupling pin 148 from its outer front face 155 to its inner front face 156 (e.g., the outer edge of recess 151) is ½ M. On the other hand, in the lateral bores 150 the wall thickness from the outer wall face to the end face of the annular shoulders 152 is equal to ¼ M minus the axial width of the edge shoulder 105 of socket 101 of FIG. 15. The different shape of the support faces for the slotted edge shoulder of the subject connection device in bores 149 or 150 was chosen because of the limited space within the hollow of the construction block.

The rod 70 in accordance with FIG. 28 differs from rod 140 of FIG. 25 only in that four cams 78 extend into each recess 77 and are disposed in the extension of the reinforcement ribs 76. These cams 78 correspond to the cams 24 of the embodiment in accordance with FIGS. 7 to 12 and have the same function. The parts with the numeral references 71 to 77 of rod 70 correspond to the parts with reference numerals 141 to 147 of the rod 140. Two rods 70 may be connected with each other by a connection device in accordance with FIG. 5 in the manner described in conjunction with FIGS. 7 to 12.

We claim:

1. A detachable connection device for connection at least two-toy-construction elements each provided with a cylindrical bore, said connection device comprising a socket or inserting into the bores of said construction elements, said socket having a cylindrical shaft section for centering said construction elements with one another, an end part of said shaft section being provided with longitudinal slots thereby rendering said end part radially elastic, a free end of said part provided with a radially protruding outer edge shoulder dimensioned to engage one of said construction elements after the insertion of the socket into the bores of the construction elements, said connection device further comprising a locking element unremovably inserted into said socket and held axially fixed in it, said locking element being rotatable in said socket between two positions, an end section at a free end of said locking element being formed by a number of ribs corresponding to the number of longitudinal slots of the rocket, said ribs in a first position of said locking element engaging an inner face of said socket in an area of a radial plane of the edge shoulder and in the second position said ribs being aligned with said slots, said locking element further comprising an engagement flange at the end of the cylindrical shaft section opposite said edge shoulder, said engagement flange having a width larger than the diameter of said cylindrical shaft section said locking element further comprising grasping means disposed outside said bore to facilitate manual turning of said locking element.

2. A connection device in accordance with claim 1, wherein an outer circumferential groove is provided between said edge shoulder and said shaft section and the axial length of said circumferential groove is less than the axial length of said cylindrical shaft section of said socket and larger than the axial length of said edge shoulder.

3. A connection device in accordance with claim 2, wherein a radially inwardly directed protrusion is provided on the inner wall of said socket int he area of the radial plane of said edge shoulder over which the end section slides during the movement of the locking element from the second into the first position whereby said locking element is secured in the first position.

4. A connection device in accordance with any one of claims 1, 2 or 3, wherein a handle extends on said locking element at the end opposite of said end section.

5. A connection device in accordance with any one of claims 1, 2, or 3, wherein said edge shoulder protrudes radially outwardly of outer diameter of the cylindrical shaft section when said locking element is in said second position and said end section secures said end part of said socket against radial inward displacement when said locking element is in said first position.

6. A connection device in accordance with claim 1, wherein a handle extends on said locking element at the end opposite of said end section and is provided with a socket like body and wings extended thereon, a cylindrical inner wall of said socket like body is provided with annular like groove sections which are separated in the circumferential direction by rib sections of said cylindrical inner wall of said socket like body in such a manner that a further identical connection device with its socket and slotted edge shoulder may be inserted in said socket like body of said handle.

7. A connection device in accordance with claim 1, wherein said socket is provided with means for securing against rotation with respect to one of said construction elements.

8. Connection device in accordance with claim 1, wherein said engagement flange integrally formed with said locking element.

9. A detachable connection device for connecting at least two toy-construction elements each provided with a bore, said connection device comprising a socket for inserting into the bores of said construction elements, said socket having a cylindrical shaft section for centering said construction element with one another, said cylindrical shaft section having a cylindrical inner bore, an end part of said shaft section being provided with longitudinal slots thereby rendering said end part radially elastic, a free end of said end part provided with a radially protruding outer edge shoulder dimensioned to engage one of said construction elements after the insertion of the socket into the bores of the construction elements, said socket further having an engagement flange at the end of the cylindrical shaft section opposite said edge shoulder, said engagement flange having width larger than the diameter of said cylindrical shaft section, wherein a locking element is unremovable inserted into said socket and axially movable relative to said socket between two positions, wherein in a first position an end section at a free end of said locking element engages an inwardly extending protrusion at one end of said inner bore of said socket and in the second position said locking element is spaced a distance from the inwardly extending protrusion of said socket;

wherein an outer circumferential groove is provided between said edge shoulder and said shaft section and the axial length of said circumferential groove is less than the axial length of said cylindrical shaft section of said socket and larger than the axial length of said edge shoulder; and     wherein said edge shoulder protrudes radially outwardly of an outer diameter of the cylindrical shaft section when said locking element is in said second position and said end section secures said end part of said socket against radial inward displacement when said locking element is in said first position.

10. A connection device in accordance with claim 9, wherein said locking element is provided with an annular outer offset and said socket is provided with a corresponding inner offset, so as to connect said locking element with said socket undetachably, but axially displaceable.

11. Connection device in accordance with claim 9, wherein a thin walled cap formed of an elastic material is placed over said socket, whereby said cap secures said socket and said locking element on a circumferential face and at the socket end which has the longitudinal slots.

12. A connection device in accordance with claim 9, wherein a radially inwardly directed protrusion is provided on an inner wall of said socket in the area of the radial plane of said edge shoulder over which the end section slides during the movement of the locking element form the second into the fist position whereby said locking element is secured in the first position.

13. A connection device in accordance with claim 9, wherein a handle extends on said locking element at the end opposite of said end section.

14. A toy assembly comprising a toy construction element with a cylindrical bore and a connection device with a cylindrical socket, a rotatable actuator, at least one longitudinally extending slot and at least one edge shoulder, said cylindrical bore having an edge area for receiving an edge shoulder of said socket, wherein said construction element is provided with engagement means for said socket when introduced into said cylindrical bore, whereby said engagement means permits an axial movement of said socket in said cylindrical bore but prevents a rotating movement of said socket, wherein said engagement means comprises an axially protruding and radially inwardly extending cam shaped for engagement into said longitudinal slot of said socket, and     wherein a radial outer annular like recess is provided at said edge area, said cam extending in said annular like recess, said recess receiving said connecting device edge shoulder as said cam engages said longitudinal slot thereby preventing rotation of said connecting device as said actuator is rotated.

* * * * *